E. PODLESAK.
INDUCTOR ALTERNATOR.
APPLICATION FILED MAR. 14, 1911.
1,024,418.
Patented Apr. 23, 1912.
2 SHEETS—SHEET 1.
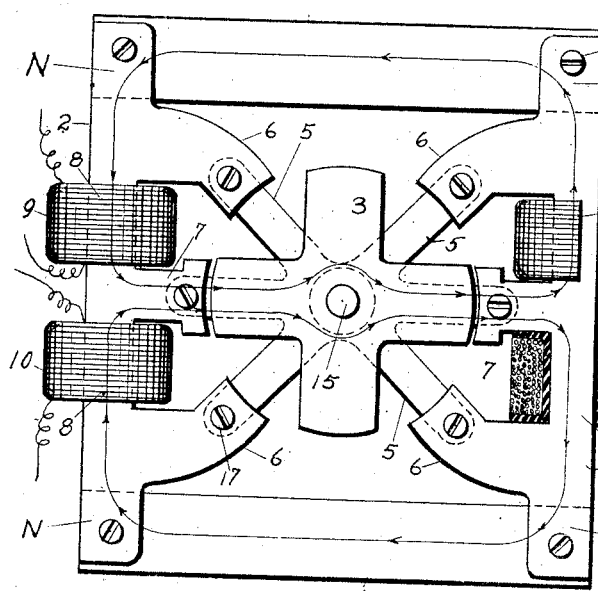
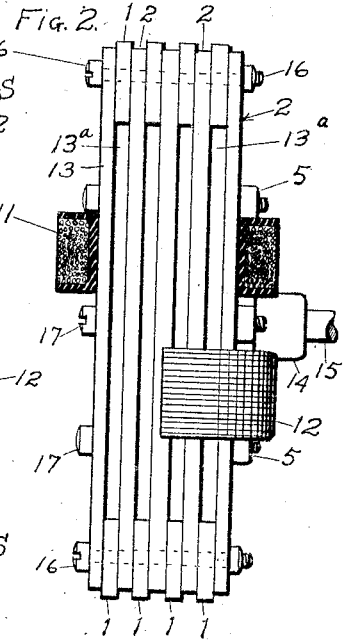
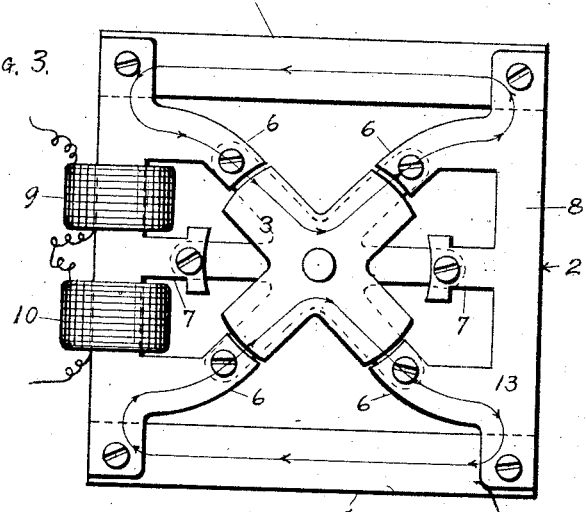
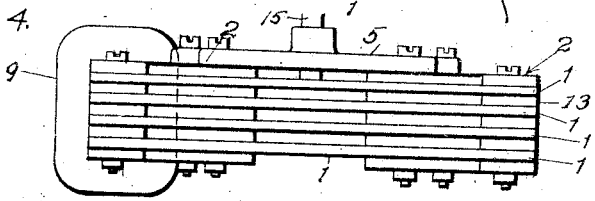
WITNESSES
S. S. Swanson
William F. Evans
INVENTOR
Emil Podlesak
By H. J. Podlesak
his Attorney

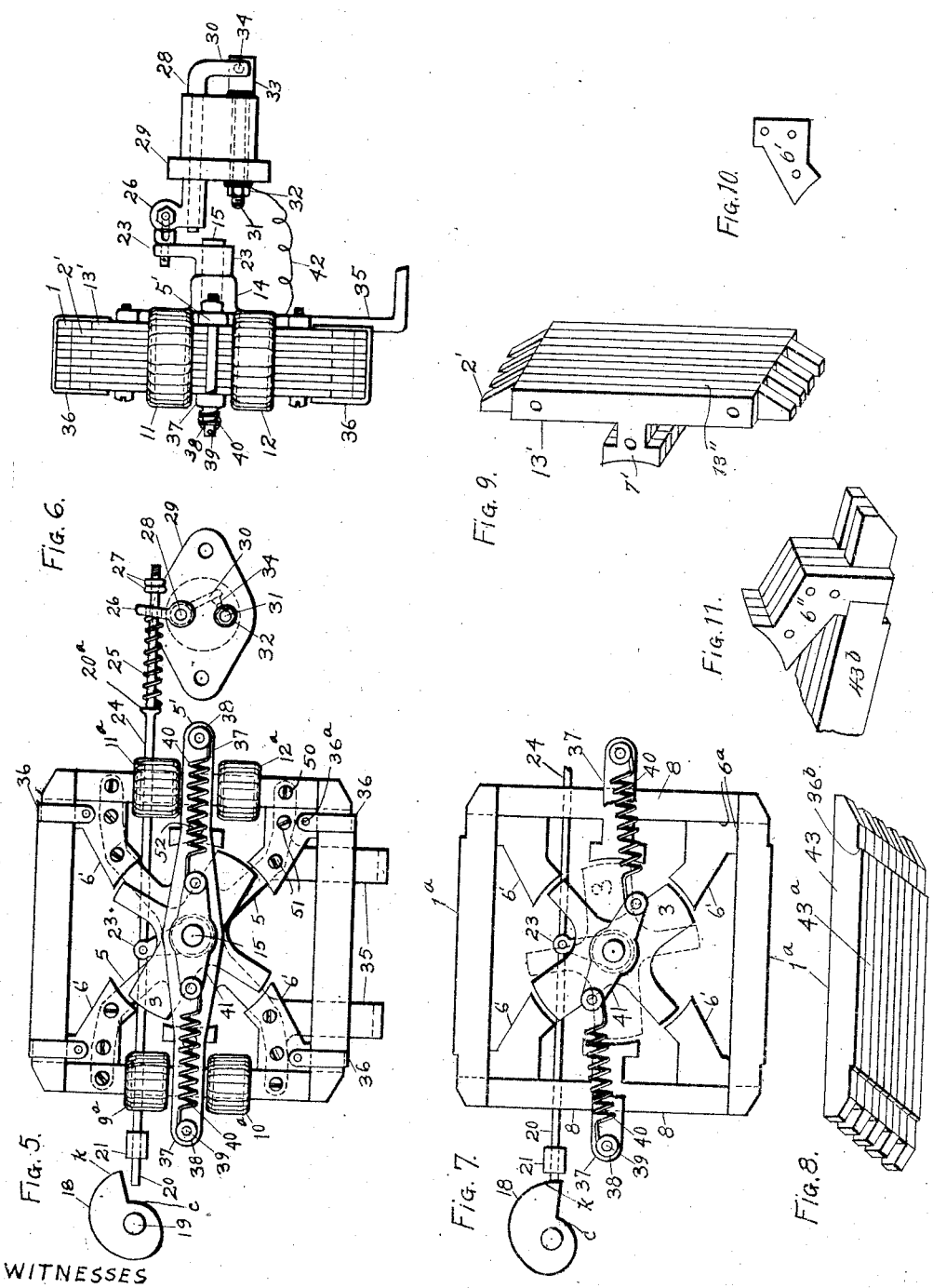

UNITED STATES PATENT OFFICE.

EMIL PODLESAK, OF TIFFIN, OHIO.

INDUCTOR-ALTERNATOR.

1,024,418.   Specification of Letters Patent.   Patented Apr. 23, 1912.

Application filed March 14, 1911. Serial No. 614,347.

*To all whom it may concern:*

Be it known that I, EMIL PODLESAK, a citizen of the United States, residing at Tiffin, in the county of Seneca and State of Ohio, have invented certain new and useful Improvements in Inductor-Alternators, of which the following is a specification.

This invention relates to electric generators designed for use in connection with ignition systems for explosive engines, and the invention has to do more particularly with an alternator of the inductor type wherein the movable inductor varies the path of the magnetic flux alternately through and outside the windings of the field to induct electro-motive force in such windings to produce current of the desired intensity for igniting the explosive charges of the engine through an appropriate sparking device.

The invention has for one of its objects to improve and simplify the construction of generators of this type so as to be comparatively simple and inexpensive to manufacture, of durable and substantial design, and capable of producing very rapid and dense magnetic flux variations through the generating windings.

Another object of the invention is the provision of a novel field structure composed of laminated magnets, pole pieces and polar projections, so connected together that the magnetic reluctance at the joints of the various laminæ is reduced to a minimum.

A further object is the employment of novel means for connecting the various parts together so that the field structure can be quickly assembled and at the same time a stable and durable frame is obtained.

Another object is to so design and arrange the parts that the spider or support for the inductor serves as a connector between the polar projections and the pole pieces, the magnets being connected with the pole pieces by connectors of novel design.

With these and other objects in view, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a front view of the generator with two of the coils partly cut away. Fig. 2 is a side view of Fig. 1. Fig. 3 is a front view of the generator with two of the coils or generating windings removed and with the inductor in the other extreme position from that shown in Fig. 1. Fig. 4 is a plan view of Fig. 3. Fig. 5 is a front view of another form of magneto showing the operating means for the rotor and the operating connection between the magneto and sparking device. Fig. 6 is a side view of Fig. 5. Fig. 7 is a front view of the machine with the rotor in another position from that shown in Fig. 5. Fig. 8 is a perspective view of one of the laminated permanent magnets. Fig. 9 is a perspective view of one of the laminated pole pieces. Fig. 10 is a detail view of one of the laminæ of the outer polar projections of the pole pieces. Fig. 11 is a detail view of a modification with respect to the manner of connecting the polar projections with the magnets.

Similar reference characters are employed to designate corresponding parts throughout the views.

Referring to the drawings, and more particularly to Figs. 1 to 4, inclusive, the field, which is of polygonal form, comprises permanent magnets 1 that have corresponding poles connected by pole pieces 2, and arranged in a magnetic field produced by the pole pieces is a rotor 3 which is preferably a mass of soft iron, laminated, of suitable form mounted for rotary or oscillatory movement. Each magnet 1 consists of spaced bars disposed parallel and each being permanently magnetized, like poles of individual bars being arranged together. The pole pieces are also constructed of bars or laminations, but instead of being all of the same length as are the laminations of the magnets, the pole pieces 2 are composed of alternately arranged long and short bars 13 and 13ª, and the short bars are so placed that their ends are set inwardly from the ends of the long bars, with the result that the ends of the pole pieces are formed with projections separated by recesses. The ends of the bars of the magnets enter the recesses formed between the extremities of the long bars 13 of the pole pieces 2, and the interleaved ends are fastened together by bolts 16 passing from the front to the rear of the field, as clearly shown in Fig. 2. The ends of the short bars 13ª bear against the inner edges of the bars or laminations of the magnets so that all the laminations of the pole pieces are in contact with the laminations of the magnets. The long laminations of the pole pieces have their side surfaces in contact with the side surfaces of the laminations of the pole pieces so that the area of contact between the magnets and pole pieces is made as great as possible so that at the joints the reluctance will be reduced to a minimum. As poor joints between the members of a magnetic field, especially when hard steel permanent magnets are used, greatly reduces the density of the magnetic flux, it will be understood that the character of joint herein described and shown is an important feature of the invention.

The pole pieces 2 are formed with outer polar projections 6 and an intermediate polar projection 7, the former being arranged diagonally of the field structure and the latter diametrically thereof. The inner end surfaces of the polar projections are arcuate and all lie in a common circle and form the polar faces. The various laminæ of the pole pieces are formed with the polar projections integral and on the limbs 8 between the polar projections are wound suitable coils 9, 10, 11 and 12, for which the limbs 8 form cores. In the present instance, the field structure is of the bi-polar type and the rotor 3 is cruciform with the arms disposed at an angle of about ninety degrees to each other. The diagonal arms or polar projections of each pole piece are arranged at ninety degrees to each other and forty-five degrees to the intermediate polar projection 7. The rotor need be oscillated through an arc of about forty-five degrees in order to bring the rotor in such relation alternately to the polar projections as to cause the magnetic flux to thread through, or to shunt around, the energizing coils or windings 12. The rotor is mounted on a shaft 15 that is journaled in a bearing 14 formed on a spider 5 that has as many arms as there are polar projections, the said arms being secured to the polar projections by bolts 17. These bolts pass through all of the laminæ of the polar projections, and hence they hold the short laminæ of the pole pieces in their proper position.

The individual windings are suitably connected in the ignition circuit and supply current to the sparking device, the rotor being actuated in proper relation to the cycle of the engine to cause current of the required intensity to flow through the sparking device when the time of ignition should occur. Assuming that the rotor is oscillating, the magnetic flux will take the path indicated by the arrows in Fig. 1, when the rotor has two oppositely disposed arms in line with the intermediate polar projections, and when the arms of the rotor are in line with the outer or diagonal polar projections, the magnetic fluxes will take the paths indicated by the arrows in Fig. 3. Referring to Fig. 1, it will be observed that the magnetic flux flows from the left end of the permanent magnets into the left pole piece to the center, where it flows from the intermediate polar piece, across the gap between the same and rotor, through the two horizontal arms of the rotor, across the gap between the rotor and right pole piece, into the intermediate polar projection, outwardly from the middle to the ends of the right pole piece to the negative poles of the magnets, the magnetic fluxes passing through the coils 9, 10, 11 and 12. When the rotor is moved to the position shown in Fig. 3, the magnetic fluxes pass from the positive poles of the magnets through the outer polar projections 6 of the left pole piece, through the upper and lower pairs of arms of the rotor, through the polar projections 6 of the right pole piece, to the negative poles of the magnets. As these fluxes do not pass through the windings, they have no effective inductive influence thereon. The rotor is adapted to be quickly shifted from one position to the other so that a very rapid change in the paths of the fluxes will be produced and it is during this variation in the magnetic flux of the field that the electro-motive force is induced in the windings to cause the current to flow through the ignition system.

In the preferred form of the invention shown in Figs. 5 to 10, inclusive, the field structure is somewhat like that shown in Fig. 1 in its general aspect, but the magnets $1^a$ are made of bars or laminations 43 and $43^a$. The bars 43 are longer than the bars $43^a$ and are so related to the latter that projections with intermediate recesses will be formed at the ends of the magnets so that the projections of the magnets will enter the recesses of the pole pieces and the projections of the pole pieces enter the recesses of the magnets, the pole pieces being made as in Fig. 1 of bars or laminations 13′ and 13″. The pole pieces have only the intermediate polar projections 7′ formed integral therewith, and the outer projections 6′ are formed of laminæ shaped as shown in Fig. 10, and are separable from the laminæ that form the body of the pole pieces, so that the coils $9^a$, $10^a$, $11^a$ and $12^a$ can be wound on a form and then applied to the pole pieces over the ends thereof before the outer polar projections are assembled. The outer polar projections have their outer ends formed with right angular edges $6^a$ so as to bear against the inner edges of the laminations of the pole pieces and magnets. The spider 5 that forms the support for the rotor 3 serves as a connector to fasten the outer polar projections in place. The extremities of the diagonal arms of the spider are prolonged so as to extend to the body of the pole pieces, and bolts 50 pass through the laminations of the pole pieces and through the extremities of the arms of the spider so as to secure the pole pieces to the latter. After the laminations of the pole pieces are thus secured, the laminations of the outer polar projections 6' can be assembled in the corners of the frame or field of the machine, and by means of bolts 51 passing through the laminations of the polar projections and arms of the spider, the pole pieces are firmly secured in place. By fitting the outer polar projections to the corners of the frames, effective joints are obtained with the pole pieces and magnets and the frame is rendered more rigid because of the bracing feature of the polar projections. The laminations of the magnets are fastened to the pole pieces by U-shaped connectors 36 that embrace all the bars of the magnets, and the extremities of the connectors overlap the outer polar projections to which they are secured by fastenings 36ª extending through the polar projections and connectors. The bars forming the magnets are recessed on their outer edges to form shoulders 36ᵇ that are arranged in alinement so as to provide transverse abutments extending across the magnets and with these abutments the connectors 36 engage so as to prevent longitudinal movement of the laminations of the magnets. The spider 5 is also supported on the pole pieces by the two diametrical arms of the spider being secured to the intermediate polar projections 7'. Legs 35 are formed on the spider or rotor support 5 to constitute brackets by which the machine can be fastened to a support.

The rotor 3 is provided with a plurality of arms and like the rotor in Fig. 1 is cruciform in shape, there being six polar projections in the field. The rotor is arranged on the shaft 15 which has one end journaled in the bearing 14 of the spider and on this shaft is an arm 23 that is adapted to receive motion from some moving part of the engine, such part being in the present instance a cam 18 fixed on a shaft 19 suitably driven from the crank shaft of the engine. This cam operates on a trip rod 20 that is movable at one end in a bearing 21 and at the opposite end in the arm or anvil 26 of the sparking device for the engine, as shown in Fig. 5. The arm 23 is pivotally connected with the rod 21 and by the cam engaging the rod the arm 23 and rotor are moved in one direction. The movement of the rotor in the opposite direction is effected by means of oppositely-disposed helical extension springs 40 that have their movable ends connected with a two-armed spider 41 fastened to the end of the rotor shaft 15 opposite to the arm 23, the outer ends of the springs being attached to spools 38 mounted on fixed studs
39. When the rotor is at rest, the springs are in alinement with each other and with the arms of the spider 41, but when the rotor is turned by the cam 18, the springs are placed under tension by being expanded through the two-armed spider 41 turning as shown in Fig. 7. The springs 40 are placed under tension while the high part $k$ of the cam 18 rides past the end of the trip rod 20, and as soon as the end of the high portion of the cam passes the trip rod, the springs 40 quickly turn the inductor in the opposite direction, with the result that the rapid movement of the arms of the inductor with respect to the polar projections causes a quick variation in the path of the fluxes through the magnetic field.

Assuming that the normal position of the inductor is that shown in Fig. 5, the inductor is moved clockwise by the cam $k$, when the latter moves in an anti-clockwise direction. When the actuating rod 20 is released from the cam, the inductor returns not to its normal position, but beyond the same, because of the momentum which it acquires under the influence of the springs 40, the inductor being in the dotted line position, Fig. 7, at the end of its recoil movement. In other words, the arms of the inductor swing through approximately forty-five degrees from the outer to the intermediate poles so that the fluxes will pass through the generating windings during this quick return movement of the conductors. The springs will finally bring the inductor to rest from the dotted line position, Fig. 7, to the full line position, Fig. 5. The timing of the inductor may be such that the impulse of current for ignition will take place on the rising flux through the generating winding, or the falling or decreasing flux through the windings may be utilized for this purpose.

The sparking device for the engine, which is operated by the same mechanism that actuates the inductor, consists of a body 29 through which passes a rotatable shaft 28 having on one end a movable electrode 30 and on its other end the anvil 26. The movable electrode 30 coöperates with a fixed electrode 33 to produce a spark, there being suitable contact points 34 on the electrode between which the spark takes place. The fixed electrode is fastened to a stem 31 which has a nut 32 on its outer end for connecting the circuit wire of the generating windings to the sparking device, the said windings being also grounded on the frame of the engine as is the movable electrode. On the rod 20 is a spring 25 confined between a shoulder 20ª on the rod and the anvil 26. On the rod is an adjustable hammer in the form of a nut 27 which is adapted to strike the arm or anvil 26 to separate the electrodes at the proper time for igniting the charge in the engine cylinder,

When the rotor is moved by the cam 18, the rod 20 causes the spring 25 to be placed under tension and the spring in turn presses the contacts of the electrodes firmly together to provide a good electrical engagement for the current to flow through the circuit. When the operating cam 18 releases the trip rod 20, the spring 25 coöperates with the springs 40 to effect a quick movement of the rotor and the inertia of the rotor and rod 20 is brought to bear on the anvil 26 by the hammer 27 striking the same and causing a quick separation of the electrodes, such separation occurring when a current of the required intensity is flowing through the circuit by the energizing of the windings of the machine.

In order to relieve the strain on the frame of the machine from the springs 40, a diametrical bar 37 is fastened to the side of the frame opposite to the spider, the said bar being fastened in place by the bolts 52 which secure the spider to the middle polar projections 7'. The cross bar 37 extends beyond the pole pieces and carries the studs 39 on which the spools 38 are mounted. This bar 37 forms a bearing for the front end of the inductor shaft, the said shaft projecting forwardly from the bar to afford connection of the rocker 41 therewith. This bar coöperates with the spider to increase the rigidity of the field and affords a better support for the rotor.

In some instance, the bars 43$^b$ of the permanent magnets may be made shorter, as shown in Fig. 11, and alternate laminations of the outer pole pieces 6'' may be made longer than the others to project between and contact with the side surfaces of the long magnet bars or laminations 43, the advantage being that the reluctance at the joints will be somewhat reduced.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. An inductor alternator comprising a field structure including a pole piece having outer and middle polar projections and connecting limbs forming cores, windings around the said cores, there being a pair of windings on each pole piece at opposite sides of the middle polar projection, and an inductor having a plurality of arms disposed in such relation that the flux will pass through the middle polar projection and one path through the inductor when the latter is in one position and through both outer polar projections and two paths through the inductor when the latter is in another position.

2. An inductor alternator comprising a polygonal field structure including a plurality of interconnected magnets and pole pieces, said pole pieces having polar projections diametrically and diagonally arranged, windings on the portions of the pole pieces between the said projections, there being a plurality of windings on each pole piece, and an inductor having arms so arranged that all of them will be opposite to the diagonal polar projections when the inductor is in one position and only half the arms will be opposite the diametrical polar projections when the inductor is in another position.

3. An inductor alternator comprising a polygonal field structure including a plurality of bar magnets and bar pole pieces connected together, outer and intermediate polar projections on each pole piece and disposed at an angle to each other, a pair of windings on each of the pole pieces, and an inductor having a less number of arms than the polar projections, said arms being disposed at an angle to each other equal to the angle between the outer polar projections of each pole piece.

4. An inductor alternator comprising a pair of permanent magnets, a pair of bar pole pieces connecting like poles of the magnets together, outer and intermediate polar projections extending inwardly from each pole piece, the outer projections being disposed at forty-five degrees to the intermediate polar projections, a cruciform unwound inductor movably related to the polar projections, and a plurality of windings on each of the pole pieces through which the flux passes when two oppositely disposed arms of the inductor are in line with the intermediate polar projections and outside of which the flux passes when all the arms of the inductor are in line with the outer polar projections.

5. A generator field structure comprising a pole piece composed of alternately arranged long and short bars so disposed as to provide recesses in the ends of the pole pieces, and magnets composed of bars having their ends set edgewise into the recesses of the pole piece with the side faces of the magnet bars in contact with the side faces of the long bars of the pole piece and the edges of the magnet bars in contact with the ends of the short bars of the pole piece.

6. A generator field structure comprising a pole piece having recesses at its end, and a permanent magnet composed of long and short bars alternately arranged with the end of the former projecting outwardly beyond the ends of the latter to enter and contact with the walls of the said recesses of the pole piece, the ends of the shorter magnet bars being in contact with the portions of the pole piece between the recesses thereof.

7. A generator field structure comprising a pole piece composed of bars arranged with the alternate bars projecting at one end beyond the intermediate bars to form recesses at the end of the pole piece, and a magnet composed of bars having their ends disposed edgewise in the said recesses with their side faces in contact with the side faces of the said projecting bars of the pole piece and with their edges in contact with the ends of the intermediate bars of the pole piece.

8. A generator field structure comprising permanent magnets composed of parallel long and short bars arranged with the ends of the short bars set inwardly from the ends of the long bars at both extremities of the magnets, and pole pieces composed of parallel long and short bars arranged with the ends of the short bars set inwardly from the ends of the long bars at both extremities of the pole pieces, the ends of the long bars of the magnets being disposed between and in contact with the ends of the long bars of the pole pieces, and the ends of the short bars of the magnets and of the pole pieces being in contact respectively with the edges of the long bars of the pole pieces and magnets.

9. A generator field structure comprising permanent magnets composed of parallel long and short bars arranged with the ends of the short bars set inwardly from the ends of the long bars at both extremities of the magnets, pole pieces each having a polar projection and composed of parallel long and short bars arranged with the ends of the short bars set inwardly from the ends of the long bars at both extremities of the pole pieces, the ends of the long bars of the magnets being disposed between and in contact with the ends of the long bars of the pole pieces, and the ends of the short bars of the magnets and of the pole pieces being in contact respectively with the edges of the long bars of the pole pieces, coils on the pole pieces at either side of the said polar projection magnets, and polar projections consisting of laminations having edge contact with the edges of the bars of the pole pieces, and a frame for holding the parts of the field structure together.

10. A generator field structure comprising permanent magnets composed of parallel long and short bars arranged with the ends of the short bars set inwardly from the ends of the long bars at both extremities of the magnets, pole pieces each having a polar projection and composed of parallel long and short bars arranged with the ends of the short bars set inwardly from the end of the long bars at both extremities of the pole pieces, the ends of the long bars of the magnets being disposed between and in contact with the ends of the long bars of the pole pieces, and the ends of the short bars of the magnets and of the pole pieces being in contact respectively with the edges of the long bars of the pole pieces and magnets, coils on the pole pieces at either side of the polar projections thereof, polar projections consisting of laminations having edge contact with the edges of the bars of the magnets, and means for holding the parts of the field structure together.

11. A generator field structure comprising permanent magnets composed of parallel long and short bars arranged with the ends of the short bars set inwardly from the ends of the long bars at both extremities of the magnets, pole pieces each having a polar projection and composed of parallel long and short bars arranged with the ends of the short bars set inwardly from the ends of the long bars at both extremities of the pole pieces, the ends of the long bars of the magnets being disposed between and in contact with the ends of the long bars of the pole pieces, and the ends of the short bars of the magnets and of the pole pieces being in contact respectively with the edges of the long bars of the pole pieces and magnets, coils on the pole pieces at either side of the polar projections thereof, polar projections consisting of laminations having edge contact with the bars of both the pole pieces and magnets, and means for holding the parts of the field structure together.

12. A generator field structure comprising oppositely-disposed magnets having recessed ends, oppositely-disposed pole pieces having their ends provided with complementary recesses to interfit with the magnets, a frame connected only with the pole pieces for preventing them from separating from the magnets, polar projections separate from the pole pieces and carried by the frame in contacting relation to the pole pieces, windings on the pole pieces, and an inductor rotatably supported by the frame.

13. A field structure including a pole piece, a magnet connected therewith, a laminated polar projection in contact with the pole piece and magnet at the joint between them, and means for holding the polar projection in such contacting relation.

14. A field structure including a laminated pole piece, a magnet composed of laminations having their ends interleaved with the laminations of the pole piece, and a polar projection separate from but in contact with the laminations of the pole piece and magnet.

15. A field structure including a laminated pole piece, a magnet composed of laminations having their ends interleaved with the laminations of the pole piece, and a laminated polar projection having its laminations in edge contact with the laminations of the pole piece and magnet.

16. A field structure including a pole piece and a magnet disposed in angular relation and jointed together, and a polar projection having an angular end to fit the corner between the pole piece and magnet.

17. A field structure including a pole piece and a magnet disposed in angular relation and joined together, a polar projection having an angular end to fit the corner between the pole piece and magnet, a connector between the pole piece and polar projection, and a connector between the magnet and polar projection.

18. A field structure including a pole piece, a magnet in contact therewith, a polar projection separate from the pole piece, means for fastening the polar projection to the pole piece, and a connector for fastening the magnet to the polar projection.

19. A field structure including a magnet having a shoulder, a pole piece in contact with the magnet and having a polar projection, a connector embracing the magnet and engaging the shoulder thereof to hold the pole piece and magnet in proper relation, and means for fastening the connector to the pole piece.

20. A field structure including a pole piece having recesses in its ends, a magnet composed of bars having their ends extending into the recesses, a connector embracing the bars, means for fastening the connector to the pole piece, and shoulders on the bars engaging the connector to prevent longitudinal movement of the bars.

21. A field structure comprising spaced pole pieces, a magnet in contact with the pole pieces, connectors embracing the magnet and detachably connected with the pole pieces, and shoulders on the magnets engaging the connectors for holding the pole pieces and magnet in proper relation.

22. A field structure comprising a magnet composed of bars, pole pieces, U-shaped connectors embracing the bars and connected with the pole pieces for holding the latter and magnet in proper relation, and shoulders on the bars arranged in alinement to form abutments extending across the magnet for engagement with the connectors to prevent longitudinal movement of the bars.

23. A field structure comprising pole pieces having recesses in their ends, polar projections on the pole pieces at the middle thereof and adjacent the recessed ends, a magnet including bars having their ends disposed in said recesses, and means for connecting the ends of the magnet to the adjacent pole pieces.

24. A field structure comprising pole pieces having projections at their ends separated by recesses, a magnet comprising long bars having their ends extending into the recesses and short bars alternated with the long bars having their ends in contact with the projections, and means embracing the ends of the magnets for holding the bars together and in relation to the pole piece and preventing longitudinal movement of the long bars.

25. A field structure comprising pole pieces having projections at their ends separated by recesses, a magnet comprising long bars having their ends extending into the recesses and short bars alternated with the long bars having their ends in contact with the projections, said bars having shoulders, connectors embracing the bars and engaging the shoulders, and means for fastening the connectors to the pole pieces to hold the bars in contact with the latter.

26. A pole piece comprising a bar having a fixed intermediate polar projection, removable outer polar projections, and coils on the portions of the bar between the projections, and bar magnets connected with the pole piece at points outwardly from the outer polar projections.

27. A pole piece comprising a bar, intermediate and outer polar projections, and coils on the bar between the projections, and bar magnets connected with the ends of the pole piece.

28. A pole piece comprising alternate long and short bars arranged with their ends so disposed as to form projections and recesses at the extremities of the pole pieces, and polar T-shaped projections on the bars.

29. A generator field magnet comprising alternate long and short bars arranged with their ends so disposed as to form projections separated by recesses at the extremities of the magnet, and a polar projection consisting of long and short laminæ, the long laminæ extending into and partially filling said recesses.

30. A generator field magnet comprising alternate long and short bars arranged with their ends so disposed as to form projections separated by recesses at the extremities of the magnet, and shoulders on the outer edges of the bars disposed in alinement to engage retaining devices.

31. In a generator, the combination of pole pieces, polar projections separate therefrom, and a rotor support forming connecting means between each pole piece and its projections.

32. In a generator, the combination of a field structure including pole pieces and magnets, a rotor support fastened to the field structure, and polar projections carried by the support and held thereby in contact with the field structure.

33. In a generator, the combination of a field structure including pole pieces and magnets interconnected to form a path for the magnetic flux, a rotor support fastened to the pole pieces, polar projections extending from the pole pieces, and connectors for connecting the magnets to the pole pieces independently of the rotor support.

34. In a generator, the combination of a field structure including pole pieces and magnets interconnected to form a path for the magnetic flux, a rotor-support fastened to the pole pieces, polar projections separate from the pole pieces and held in relation thereto by being secured to the rotor support, and connectors uniting the magnets to the polar projections.

35. In a generator, the combination of a rotor support, laminated pole pieces fastened to the support, laminated polar projections fastened to the support and held thereby in contact with the pole pieces, and magnets connected with the pole pieces.

36. In a generator, the combination of a rotor support, laminated pole pieces fastened to the support, laminated polar projections fastened to the support and held thereby in contact with the pole pieces, laminated magnets connected with the pole pieces, and connectors embracing the magnets and connected with the polar projections.

37. In a generator, the combination of a polygonal field structure consisting of magnets and pole pieces arranged alternately with their adjacent ends connected, polar projections shaped to fit the corner between adjacent magnets and pole pieces, and a rotor support secured to the field structure and holding the polar projections.

38. In a generator, the combination of a polygonal field structure consisting of magnets and pole pieces arranged alternately with their adjacent ends connected, polar projections shaped to fit the corner between adjacent magnets and pole pieces, a rotor support secured to the field structure and holding the polar projections, said polar projections being disposed diagonally of the field structure, additional polar projections on the pole pieces disposed diametrically of the field structure, coils in inductive relation to the pole pieces, and a rotor on the said support.

39. In a generator, the combination of a polygonal field structure including alternately arranged and connected permanent magnets and pole pieces, polar projections separate from the pole pieces, polar projections integral with the pole pieces, a rotor support secured to the field structure and supporting the first-mentioned polar projections, coils on the pole pieces, and a rotor on the rotor support in magnetic relation to the polar projections for directing the flux alternately through and outside the coils.

In testimony whereof I affix my signature in presence of two witnesses.

EMIL PODLESAK.

Witnesses:
ARTHUR KLECKNER,
PAULINA PODLESAK.

---

Copies of this patent may be obtained for five cents each, by addressing the "Commissioner of Patents, Washington, D. C."